(12) United States Patent
Iwasaki et al.

(10) Patent No.: US 8,513,842 B2
(45) Date of Patent: Aug. 20, 2013

(54) HEAT RADIATION STRUCTURE FOR ROTARY ELECTROMOTOR

(75) Inventors: Norihisa Iwasaki, Hitachinaka (JP); Junnosuke Nakatsugawa, Hitachi (JP); Yuji Enomoto, Hitachi (JP); Masashi Kitamura, Mito (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 13/034,360

(22) Filed: Feb. 24, 2011

(65) Prior Publication Data

US 2011/0234028 A1    Sep. 29, 2011

(30) Foreign Application Priority Data

Mar. 25, 2010   (JP) .................. 2010-070146

(51) Int. Cl.
*H02K 9/22*   (2006.01)

(52) U.S. Cl.
USPC ................ 310/64; 310/65; 310/410

(58) Field of Classification Search
USPC ........... 310/64, 65, 410, 271, 156.27
IPC ........................................... H02K 9/22
See application file for complete search history.

(56) References Cited

U.S. PATENT DOCUMENTS

| 3,685,926 | A | 8/1972 | Blum | |
|---|---|---|---|---|
| 8,120,227 | B2* | 2/2012 | Leroy et al. | 310/216.114 |
| 2009/0309431 | A1* | 12/2009 | Kaminski et al. | 310/52 |
| 2011/0278967 | A1* | 11/2011 | Utaka | 310/52 |
| 2011/0304228 | A1* | 12/2011 | Bradfield | 310/54 |

FOREIGN PATENT DOCUMENTS

| JP | Sho 60-117669 | | 8/1985 |
|---|---|---|---|
| JP | Hei 3-3160 | | 1/1991 |
| JP | 06-70508 | | 3/1994 |
| JP | 08-149756 | | 6/1996 |
| JP | 8-322170 | | 12/1996 |
| JP | 10-290543 | | 10/1998 |
| JP | 10290543 | A * | 10/1998 |
| JP | 2007-236045 | | 9/2007 |
| JP | 2007-252018 | | 9/2007 |
| JP | 2007252018 | A * | 9/2007 |
| JP | 2009-118629 | | 5/2009 |
| JP | 2009118629 | A * | 5/2009 |
| WO | WO 2007003835 | A1 * | 1/2007 |

OTHER PUBLICATIONS

Machine translation of JP2009-118629 (published May 2009, translated Dec. 2012).*
Machine translation of JP2007-252018 (published Sep. 2007, translated Dec. 2012).*
Machine translation of JP10-290543 (published Oct. 1998, translated Dec. 2012).*

* cited by examiner

*Primary Examiner* — Tran Nguyen
*Assistant Examiner* — Michael Andrews
(74) *Attorney, Agent, or Firm* — Antonelli, Terry, Stout & Kraus, LLP.

(57) ABSTRACT

There is disclosed a rotary electromotor including a stator, a stator winding on the stator, a stator frame, a rotator, end covers, and a highly heat-conductive member. The stator has a plurality of magnetic poles. The stator frame supports the stator. The rotator is supported by the stator with a gap therefrom such that the rotator is rotatable. The end covers close opposite ends of the stator frame. The highly heat-conductive member is fixed by a resin material in a space defined inside the stator, the stator frame, and the end covers.

5 Claims, 7 Drawing Sheets

1

HEAT RADIATION STRUCTURE FOR ROTARY ELECTROMOTOR

FIELD OF THE INVENTION

The present invention relates to a rotary electromotor.

BACKGROUND OF THE INVENTION

A rotary electromotor, particularly a permanent magnet synchronous electromotor, which is small in size and highly efficient, is suitable for use in household electrical appliances, industries, and automotive vehicles, and its range of usage or application in these fields is widening.

To respond to the recent demand for space saving in apparatuses in these fields, miniaturization of the electromotor is essentially required. In miniaturizing the electromotor with its output kept substantially the same, a heat issue occurs.

A heat radiation area, or an area from which generated heat is radiated, of a miniaturized high-power electromotor is relatively small for the amount of the generated heat. Thus, the internal temperature of the electromotor in use becomes high to adversely affect the properties of the electromotor. Namely, there are caused problems such as rise in winding resistance and thermal demagnetization of the permanent magnet.

With the above background, various designs have been considered to enable excellent heat radiation performance in a miniaturized high-power electromotor.

Among the known techniques to enhance the radiation performance are included those disclosed in JP-A-2007-236045 and JP-A-Hei 8-149756.

According to JP-A-2007-236045, a layer or member of a highly-flexible heat-conductive material that is interposed between a stator and a stator frame of an electromotor enhances the radiation performance of the electromotor.

According to JP-A-Hei 8-149756, an electromotor is produced such that a metal film is formed between its stator and stator frame, and an irregular space between the stator and stator frame, which is derived from lamination forming of the stator, is filled at the time of a shrink fitting process.

SUMMARY OF THE INVENTION

JP-A-2007-236045 teaches to interpose a layer or member of a highly-flexible heat-conductive material between the stator and the stator frame. However, in most cases such a heat conductive member conducts heat well in a direction along its major surface but poorly in a direction perpendicular to the surface, and thus heat conduction from the stator to the stator frame in the perpendicular direction is insufficient.

On the other hand, JP-A-Hei 8-149756 teaches to form a metal film between the stator and the stator frame. However, since it is not ensured that the metal film reliably fills up the space between the stator and the stator frame, the effect of the technique is unobvious.

An object of this invention is to provide a miniaturized high-power rotary electromotor with excellent radiation performance.

To attain the object, the invention provides a rotary electromotor including a stator having a plurality of magnetic poles, a stator winding on the stator, a stator frame supporting the stator, a rotor supported by the stator with a gap therefrom such that the rotor is rotatable, and end covers closing opposite ends of the stator frame. The stator, the stator frame, and the end covers define inside thereof a space which is filled with a resin material, and a highly heat-conductive member is formed integrally with the resin material between the stator winding and the end covers.

To attain the object, the invention also provides a rotary electromotor including a stator having a plurality of magnetic poles, a stator winding on the stator, a stator frame supporting the stator, a rotor supported by the stator with a gap therefrom such that the rotor is rotatable, and end covers closing opposite ends of the stator frame. The stator, the stator frame, and the end covers define inside thereof a space which is at least partially filled with a resin material, and a highly heat-conductive member is formed integrally with the resin material between the stator and the end covers.

A stack of a plurality of the highly heat-conductive members may be fixed by the resin material.

A plurality of the highly heat-conductive members may be fixed by the resin material such that the highly heat-conductive members are disposed with a spacing from one another in a radial direction of the electromotor.

The highly heat-conductive member may be disposed intermittently in a circumferential direction of the electromotor.

The highly heat-conductive member may be disposed to extend from two axially opposite ends of a heat generating portion of the rotor to a shaft that supports the rotor.

The rotary electromotor may be of permanent magnet type including a permanent magnet in the rotor.

The rotary electromotor may be of induction type including a secondary conductor in the rotor.

A space between the stator and the stator frame may be filled with the resin material.

Projections may be formed on at least one of an inner circumferential surface of the stator frame and inner surfaces of the end covers in order to increase a contact area of the resin material with the stator, the stator frame, and the end covers.

Corners of the projections formed on at least one of the inner circumferential surface of the stator frame and the inner surfaces of the end covers may be rounded at a curvature.

The highly heat-conductive member may be disposed between the stator and the stator frame and formed integrally with the resin material.

The projections formed on the stator frame may be arranged in a circumferential direction of the electromotor.

The projections formed on the stator frame may be arranged in an axial direction of the electromotor.

To attain the above object, the invention further provides a rotary electromotor including a stator, a stator winding on the stator, a stator frame, a rotor, end covers, and a highly heat-conductive member and a resin material. The stator has a plurality of magnetic poles, and is formed of an iron material having a saturation magnetic flux density not lower than 2.2 T. The stator frame supports the stator. The rotor is supported by the stator with a gap therefrom such that the rotor is rotatable. The rotor includes a permanent magnet having a magnetic flux density not lower than 1.37 T. The end covers close opposite ends of the stator frame. The highly heat-conductive member and the resin material are formed integrally with each other between the stator and the end covers.

According to the invention, a miniaturized, high-power rotary electromotor with excellent radiation performance can be realized.

DETAILED DESCRIPTION OF THE PREFERRED EMBODIMENTS

As described above, a permanent magnet synchronous electromotor has advantages that it is small-sized and highly efficient. In developing a permanent magnet synchronous electromotor with excellent radiation performance as well as the advantages, the inventors of this application conducted various studies to find that graphite sheet is a prospective material for use as the heat conductive member.

Graphite sheet, which conducts more heat along its major surface than perpendicularly thereto, is capable of alleviating occurrence of hot spots in an apparatus using the electromotor, and of efficiently transferring heat from a thermal source to a heatsink. Further, in view of that use of graphite sheet which has a relatively small specific gravity can contribute to weight reduction of the apparatus and can reduce the load imposed on a substrate, it can be said that graphite sheet is a suitable material for use in household appliances, industries, and automotive vehicles, for instances.

Thus, the inventors considered employing graphite sheet for heat radiation in the rotary electromotor of which miniaturization and weight reduction are demanded. Since graphite sheet conducts heat excellently in a direction along its major surface, the inventors found that graphite sheet is considerably suitable for radiation of heat, which is generated by a coil of a rotator of a rotary electromotor, in an axial direction of the electromotor.

As a result of the studies, the inventors developed the following embodiments.

Referring to FIGS. 1 to 10, there will be described embodiments of the invention each in the form of a rotary electromotor with excellent radiation performance. It is noted that in the following description a permanent magnet rotary electromotor is illustrated as a rotary electromotor to which the invention is applied, for exemplary purposes only, and the invention is equally applicable to other types of rotary electromotors having a similar structure, e.g., induction motor and reluctance motor.

First Embodiment

Figure 1:
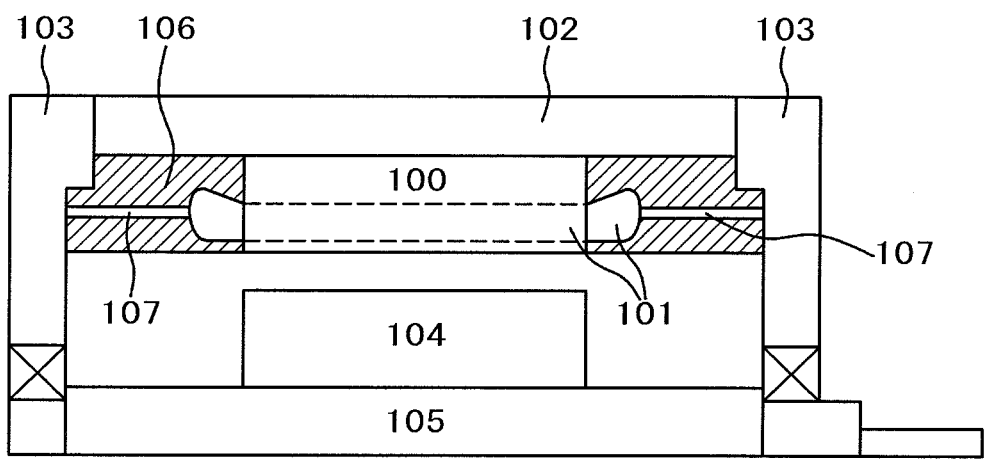
FIG. 1 is a cross-sectional view of a rotary electromotor according to a first embodiment of the invention.

FIG. 1 is a fragmentary cross-sectional view of a rotary electromotor according to a first embodiment of the invention.

In FIG. 1, reference numeral 100 denotes a stator of the rotary electromotor. The stator 100 has a plurality of magnetic poles. Around the stator 100 is wound a stator winding 101. The stator 100 is fixed on a stator frame 102. At two axially opposite ends of the stator frame 102, end covers 103 are disposed to close an internal space of the electromotor. A rotator 104 is disposed with a gap from the stator 100. The power of the rotator 104 is transmitted by a rotary shaft 105. Reference numeral 106 denotes a resin material filling a space between the end covers 103 and the stator 100. Inside the resin material 106, a highly heat-conductive sheet 107 is integrally formed to connect the stator winding 101 and the end covers 103. The sheet 107 has a thermal conductivity of W/(m·K) or higher.

Generally, the thermal source in a rotary electromotor is mainly constituted by the stator, stator winding, and rotator that respectively correspond to the stator 100, stator winding 101, and rotator 104 in the example of FIG. 1.

This embodiment is to enhance the radiation performance from the stator 100 and the stator winding 101. In the known structure, heat generated by the stator 100 is released or discharged by being conducted to the end covers 103 via the stator frame 102, and heat generated by the stator winding 101 is discharged by being conducted to the end covers 103 via the stator 100.

In this embodiment, the conduction of the heat generated at the stator 100 and the stator winding 101 is facilitated by filling a space which is formed in the known structure between the stator and the end covers, with a resin material having a thermal conductivity higher than that of the atmosphere.

The thermal conductivity of the atmosphere is generally about 0.03 W/(m·K), while that of the resin material used in the embodiment is about 0.3-3.0 W/(m·K). Hence, the thermal conductivity of the resin material is about 10 to 100 times that of the atmosphere. However, when compared with metal, the thermal conductivity of the resin material is considerably low.

To further enhance the radiation performance in view of the above, this embodiment forms between the stator winding 101 and the end covers 103 the highly heat-conductive sheet 107 in an annular shape integrally with the resin material. The highly heat-conductive sheet 107 may be of graphite, for instance. This arrangement considerably enhances the heat conduction performance of the electromotor in the axial direction. A sheet of graphite has a higher thermal conductivity than sheets made of other highly heat-conductive materials such as aluminum and silver, and is so flexible that it is easy to form the graphite sheet integrally within the resin material.

The sheet 107 is attached to left and right ends of the winding 101 as seen in FIG. 1. More specifically, a piece of the sheet 107 thermally connects the left end of the winding 101 and the left one of the two end covers 103, and another piece of the sheet 107 thermally connects the right end of the winding 101 and the right end cover 103. The sheet 107 is disposed such that its major surface is along an inner circumferential surface of the stator frame 102 or along the rotary shaft 105. More specifically, the sheet 107 is disposed such that the major surface of the sheet 107 is substantially parallel to the inner circumferential surface of the stator frame 102 or to the rotary shaft 105 in order to make short the distance across which the heat is to be conducted. As described above, the sheet 107 is of graphite, and thus conducts heat better in a direction along its major surface than in a direction of its thickness. Hence, the sheet 107 can efficiently conduct the heat of the winding 101 to the end covers 103. Further, since the sheet 107 is disposed such that its major surface is along the rotary shaft 105, the radial dimension of the rotary electromotor is inhibited from increasing, which is contributes to miniaturization of the electromotor. In this embodiment, a layer of the resin material is interposed between the sheet 107 and the inner circumferential surface of the stator frame 102. Thus, the heat generated at the stator 100 and stator winding 101 as a thermal source is transferred to the end covers 103 along two heat conduction paths with a higher thermal conductivity than that of the resin material, i.e., a first path via the stator frame 102 and a second path via the sheet 107. The first and second paths are disposed parallel to each other between the stator 100 and stator winding 101 and the end covers 103.

Second Embodiment

Figure 2:
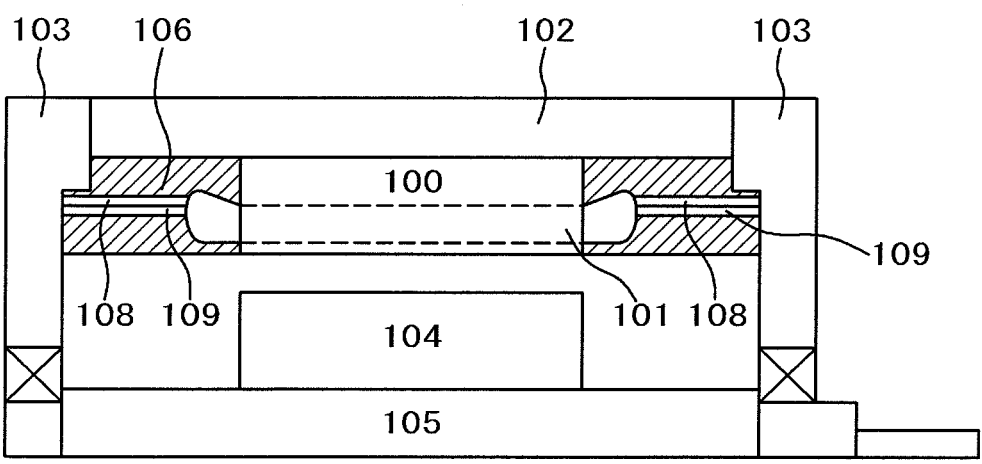
FIG. 2 is a cross-sectional view of a rotary electromotor according to a second embodiment of the invention.

FIG. 2 is a cross-sectional view of a rotary electromotor according to a second embodiment.

A structure according to the second embodiment shown in FIG. 2 is almost identical with that of the first embodiment shown in FIG. 1. The only difference is that in the structure of the second embodiment the member thermally connecting the stator winding 101 to the end covers 103 is a stack of a plurality of highly heat-conductive sheets 108, 109.

That is, according to the second embodiment, the cross-sectional area of the member providing the heat conduction path from the stator winding 101 to the end covers 103 is increased, thereby considerably enhancing radiation performance from the ends of the stator winding 101. Further, since the stack of highly heat-conductive sheets is attached such that its major surface is along the rotary shaft 105 as described above, the radial dimension of the electromotor is inhibited from increasing although a plurality of highly heat-conductive sheets 108, 109 are used.

In this embodiment, the stack of highly heat-conductive sheets 108, 109 is disposed such that major surfaces of the sheets 108, 109 are along the inner circumferential surface of the stator frame 102 or the rotary shaft 105. More specifically, the sheets 108, 109 are disposed such that their major surfaces extend substantially parallel to the inner circumferential surface of the stator frame 102 or the rotary shaft 105 in order to make short the distance across which the heat is to be conducted. In this embodiment, a layer of the resin material is interposed between the sheet 108 and the inner circumferential surface of the stator frame 102. Thus, the heat generated at the stator 100 and stator winding 101 as a thermal source is conducted to the end covers 103 along two heat conduction paths with a higher thermal conductivity than that of the resin material, i.e., a first path via the stator frame 102 and a second path via the stack of sheets 108, 109. The first and second paths are disposed parallel to each other between the stator 100 and stator winding 101 and the end covers 103.

Third Embodiment

Figure 3:
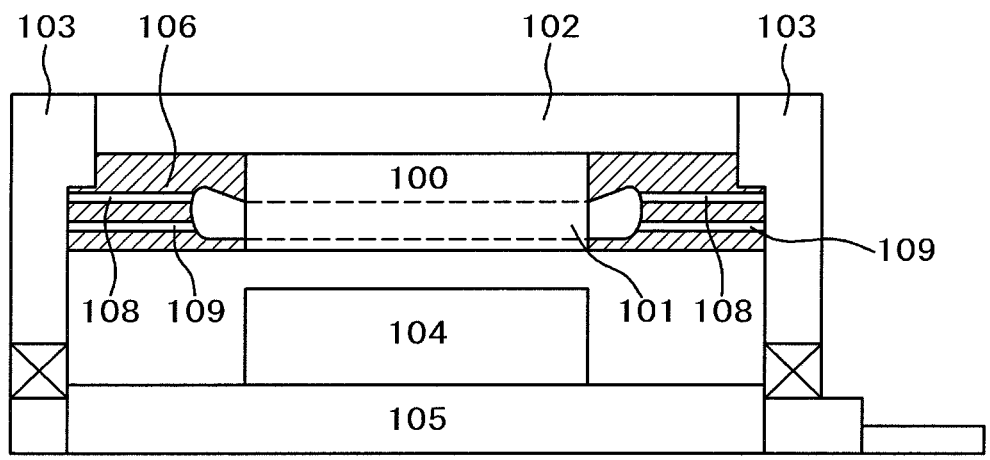
FIG. 3 is a cross-sectional view of a rotary electromotor according to a third embodiment of the invention.

FIG. 3 is a cross-sectional view of a rotary electromotor according to a third embodiment.

A structure of the third embodiment shown in FIG. 3 is almost identical with that of the first and second embodiments. The only difference is that the ends of the stator winding 101 are thermally connected to the end covers 103 by discrete highly heat-conductive sheets 108, 109. That is, in the third embodiment, a plurality of highly heat-conductive sheets, which is two sheets 108, 109 in the specific example of FIG. 3, are disposed such that the sheets 108, 109 are separated from one another in the electromotor radial direction. A space between each two adjacent highly heat-conductive sheets is filled with the resin material 106.

According to the third embodiment, the radiation performance of the electromotor is further enhanced. In addition, where the heat generation distribution in the stator winding 101 is uneven in the electromotor radial direction, the radiation performance can be further enhanced by disposing the sheets 108, 109 at positions corresponding to places in the stator winding 101 where large heat is generated, for instance.

In this embodiment, the highly heat-conductive sheets 108, 109 are disposed such that their major surfaces are along the rotary shaft 105. Thus, although a plurality of highly heat-conductive sheets are used, the radial dimension of the rotary electromotor is inhibited from increasing.

In this embodiment, the sheets 108, 109 are disposed such that their surfaces are along the inner circumferential surface of the stator frame 102 or the rotary shaft 105. More specifically, the sheets 108, 109 are disposed such that their surfaces extend substantially parallel to the inner circumferential surface of the stator frame 102 or the rotary shaft 105 in order to make short the distance across which the heat is to be conducted. In this embodiment, a layer of the resin material is interposed between the sheet 108 and the inner circumferential surface of the stator frame 102 and between the sheets 108 and 109. Thus, the heat generated at the stator 100 and stator winding 101 as a thermal source is conducted to the end covers 103 along three heat conduction paths with a higher thermal conductivity than that of the resin material, i.e., a first path via the stator frame 102, a second path via the sheet 108, and a third path via the sheet 109. The first to third paths are disposed parallel to one another between the stator 100 and stator winding 101 and the end covers 103.

Fourth Embodiment

Figure 4:
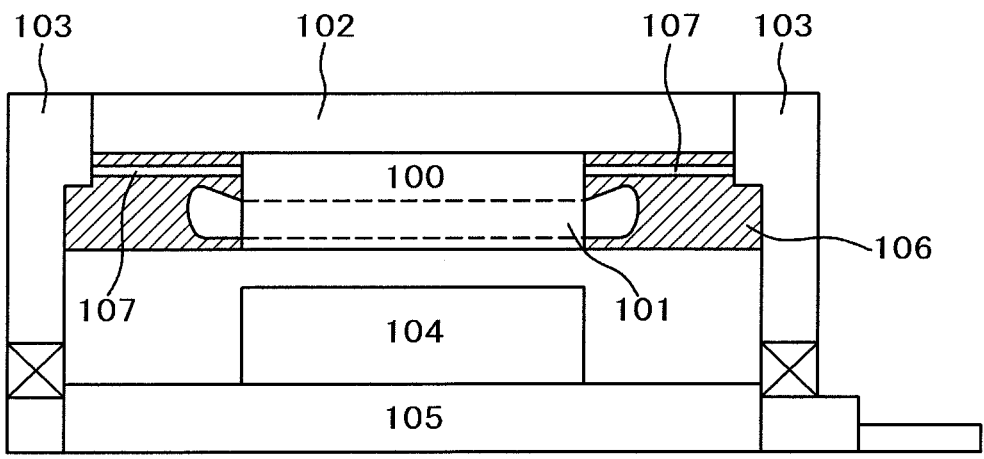
FIG. 4 is a cross-sectional view of a rotary electromotor according to a fourth embodiment of the invention.

FIG. 4 is a cross-sectional view of a rotary electromotor according to a fourth embodiment of the invention.

In the first to third embodiments, the heat conduction path for heat radiation extends from the stator winding 101 to the end covers 103. In contrast, in the fourth embodiment the member that a highly heat-conductive sheet 107 thermally connects to the end covers 103 is the stator 100, as shown in FIG. 4.

According to the fourth embodiment, heat can be efficiently discharged particularly from the stator 100. The fourth embodiment is particularly effective when applied to a motor in which heat generation is large at the stator. The fourth embodiment is also effective when applied to a motor used in a higher speed range, since the amount of heat generation at the stator increases with the rotation speed of the motor.

In this embodiment, the sheet 107 is disposed such that its major surface is along the inner circumferential surface of the stator frame 102 or the rotary shaft 105. More specifically, the sheet 107 is disposed such that the surface extends substantially parallel to the inner circumferential surface of the stator frame 102 or the rotary shaft 105 in order to make short the distance across which the heat is to be conducted. In this embodiment, a layer of the resin material is interposed between the sheet 107 and the inner circumferential surface of the stator frame 102. Thus, the heat generated at the stator 100 and stator winding 101 as a thermal source is conducted to the end covers 103 along two heat conduction paths with a higher thermal conductivity than that of the resin material, i.e., a first path via the stator frame 102 and a second path via the sheet 107. The first and second paths are disposed parallel to each other between the stator 100 and stator winding 101 and the end covers 103.

Fifth Embodiment

Figure 5:
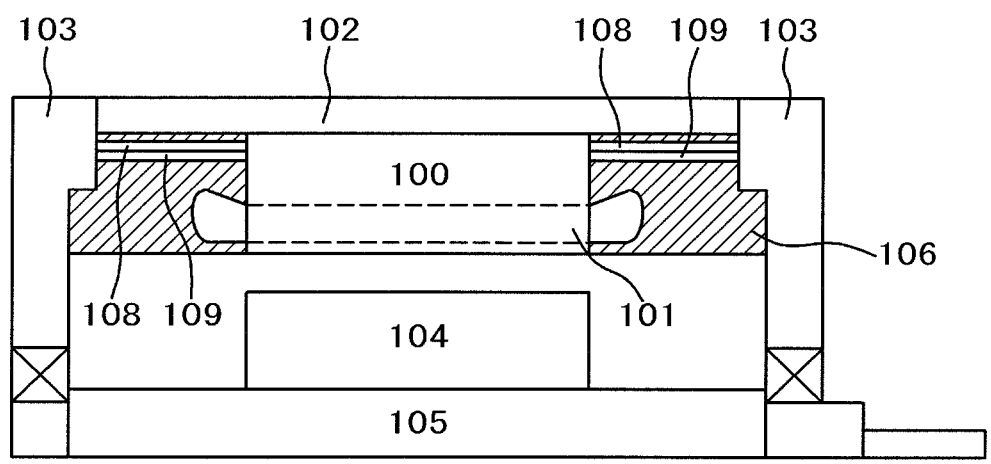
FIG. 5 is a cross-sectional view of a rotary electromotor according to a fifth embodiment of the invention.

FIG. 5 is a cross-sectional view of a rotary electromotor according to a fifth embodiment of the invention.

A structure of the fifth embodiment is almost identical with that of the fourth embodiment, but differs therefrom in that the member that thermally connects the stator 100 to the end covers 103 is a stack of a plurality of highly heat-conductive sheets 108, 109. According to the fifth embodiment, the cross-sectional area of the member providing the heat conduction path from the stator 100 to the end covers 103 is increased, thereby considerably enhancing the radiation performance of the electromotor.

Since the stack of the sheets 108, 109 is disposed such that its major surface is along the rotary shaft 105 as described above, the radial dimension of the rotary electromotor is inhibited from increasing although a plurality of highly heat-conductive sheets, which is two sheets 108, 109 in the specific example of FIG. 5, are used.

In this embodiment, the stack of highly heat-conductive sheets 108, 109 is disposed such that major surfaces of the sheets 108, 109 are along the inner circumferential surface of the stator frame 102 or the rotary shaft 105. More specifically, the sheets 108, 109 are disposed such that their major surfaces extend substantially parallel to the inner circumferential surface of the stator frame 102 or the rotary shaft 105 in order to make short the distance across which the heat is to be conducted. In this embodiment, a layer of the resin material is interposed between the sheet 108 and the inner circumferential surface of the stator frame 102. Thus, the heat generated at the stator 100 and stator winding 101 as a thermal source is conducted to the end covers 103 along two heat conduction paths with a higher thermal conductivity than that of the resin material, i.e., a first path via the stator frame 102 and a second path via the stack of sheets 108, 109. The first and second paths are disposed parallel to each other between the stator 100 and stator winding 101 and the end covers 103.

Sixth Embodiment

Figure 6:
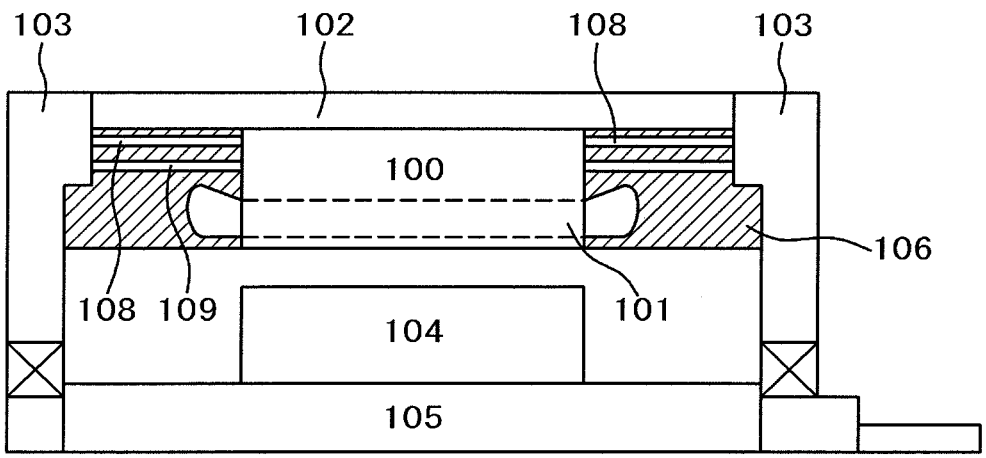
FIG. 6 is a cross-sectional view of a rotary electromotor according to a sixth embodiment of the invention.

FIG. 6 is a cross-sectional view of a rotary electromotor according to a sixth embodiment.

A structure of the sixth embodiment shown in FIG. 6 is almost identical with that of the fifth embodiment shown in FIG. 5. The only difference of the sixth embodiment from the fifth embodiment is that the highly heat-conductive sheets are disposed such that the sheets 108, 109 are separated from one another. A space between each two adjacent highly heat-conductive sheets 108, 109 is filled with the resin material 106. Thus, where the heat generation distribution in the stator 100 is uneven, the radiation performance can be enhanced. For instance, heat generated at different places in the stator, e.g., a teeth portion and a core back portion, can be flexibly or individually dealt with.

As described above, the sheets 108, 109 are attached such that their major surfaces are along the rotary shaft 105. Thus, the radial dimension of the rotary electromotor is inhibited from increasing although a plurality of highly heat-conductive sheets, which are two sheets 108, 109 in the specific example of FIG. 6, are used.

According to this embodiment, the sheets 108, 109 are disposed such that their major surfaces are along the inner circumferential surface of the stator frame 102 or the rotary shaft 105. More specifically, the sheets 108, 109 are disposed such that their major surfaces extend substantially parallel to the inner circumferential surface of the stator frame 102 or the rotary shaft 105 in order to make short the distance across which the heat is to be conducted. In this embodiment, a layer of the resin material is interposed between the sheet 108 and the inner circumferential surface of the stator frame 102 and between the sheets 108 and 109. Thus, the heat generated at the stator 100 and stator winding 101 as a thermal source is conducted to the end covers 103 along three heat conduction paths with a higher thermal conductivity than that of the resin material, i.e., a first path via the stator frame 102, a second path via the sheet 108, and a third path via the sheet 109. The first to third paths are disposed parallel to one another between the stator 100 and stator winding 101 and the end covers 103.

Seventh Embodiment

Figure 7:
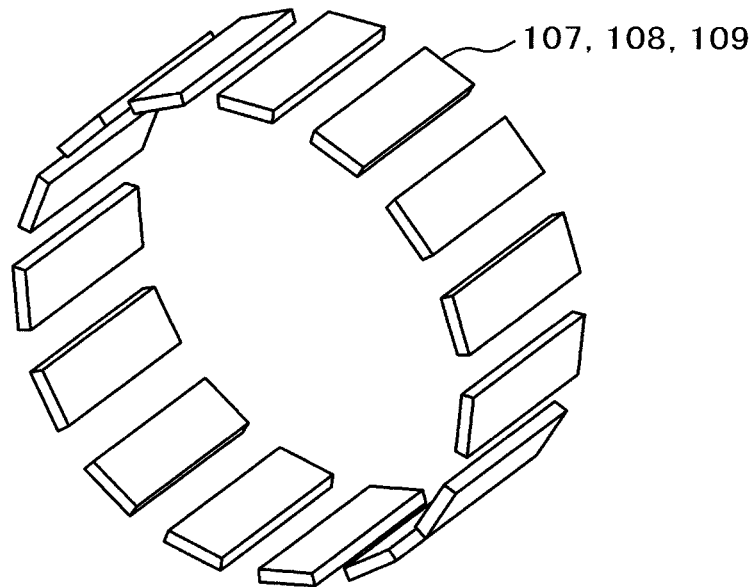
FIG. 7 shows a seventh embodiment of the invention.

FIG. 7 is a perspective view of a highly heat-conductive sheet according to a seventh embodiment of the invention.

In the embodiment shown in FIG. 7, the highly heat-conductive sheet 107, 108, 109 of the first to sixth embodiments shown in FIGS. 1-6 is disposed intermittently in a circumferential direction of the electromotor, that is, the highly heat-conductive sheet 107, 108, 109 is disposed such that segments of the highly heat-conductive sheet 107, 108, 109 are circumferentially arranged at a spacing interval. According to this embodiment, it is not required to form the highly heat-conductive sheet in an annular shape, which facilitates integral forming of the sheet with the resin material. In particular, in a case where the highly heat-conductive sheet is to be disposed to extend from teeth of the stator to the end covers as in the sixth embodiment, an annular shape is not suitable since the stator winding disposed between the teeth of the stator interferes with the annular sheet to make it impossible to dispose the annular sheet in a close vicinity of surfaces of the teeth with respect to an axial direction of the teeth. In this case, the property of the highly heat-conductive sheet is best utilized by severing the highly heat-conductive sheet into segments of a width corresponding to the interval between the teeth, and circumferentially arranging the segments, as in this embodiment.

Eighth Embodiment

Figure 8A:
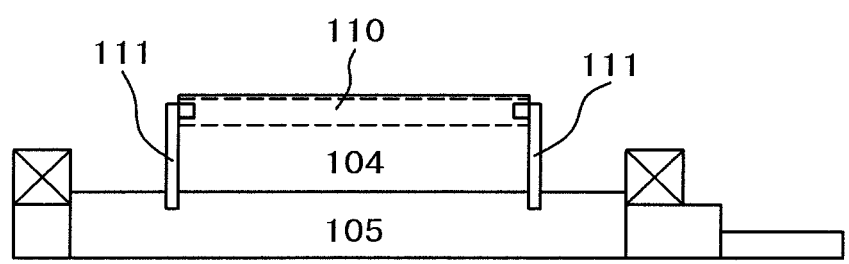
FIGS. 8A and 8B are cross-sectional views showing a rotator according to an eighth embodiment of the invention.
Figure 8B:
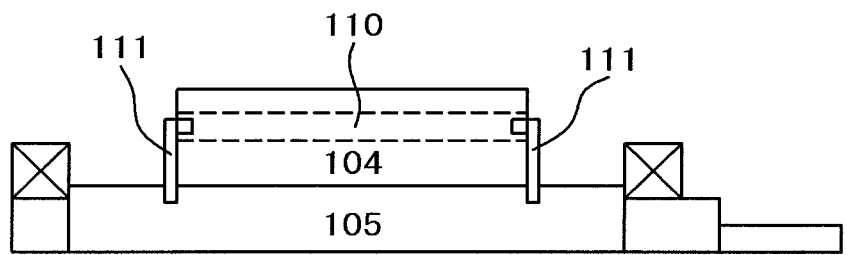

FIGS. 8A and 8B are cross-sectional views of rotary electromotors according to an eighth embodiment of the invention.

In the embodiment shown in FIGS. 8A and 8B, the structure of the rotator rotated in a rotary electromotor is improved. In an example shown in FIG. 8A, the rotator includes a core 104, a magnet 110, a shaft 105, and highly heat-conductive sheets 111. The magnet 110 is attached on a surface of the core 104, and the shaft 105 transmits the power of the rotator. The highly heat-conductive sheets 111 are disposed on two ends of the magnet 110 in the axial direction of the electromotor and extend therefrom on and along end surfaces of the core 104 into the shaft 105. That is, the highly heat-conductive sheets 111 thermally connect the axial ends of the magnet 110 to the shaft 105.

According to the eighth embodiment, it is enabled to directly conduct the heat generated at the magnet to the shaft 105, and it is prevented that the heat is retained in the rotator.

In the known structure, the heat generated at the magnet is conducted to the shaft via the rotator core. On the other hand, in the embodiment where the heat is directly conducted to the shaft, rise in the temperature of the rotator core is inhibited and the heat received by the shaft is discharged to an exterior heat-conductive medium or the atmosphere, thereby enhancing the radiation performance of the electromotor. Thus, conducting the heat directly to the shaft is considerably advantageous.

FIG. 8B shows an example where the principle of the eighth embodiment is applied to an IPM motor in which the magnet 110 is implanted inside the rotator core 104. The principle of the embodiment is also applicable to an induction motor in which the rotator includes a secondary conductor. When the embodiment is applied to such an induction motor, the highly heat-conductive sheet is disposed to extend from the secondary conductor generating heat to the shaft so as to obtain the effect of the embodiment.

The eighth embodiment can be implemented in combination with any of the first to seventh embodiments. When the embodiment is implemented in such combination, the radiation performance is further enhanced.

Ninth Embodiment

Figure 9:
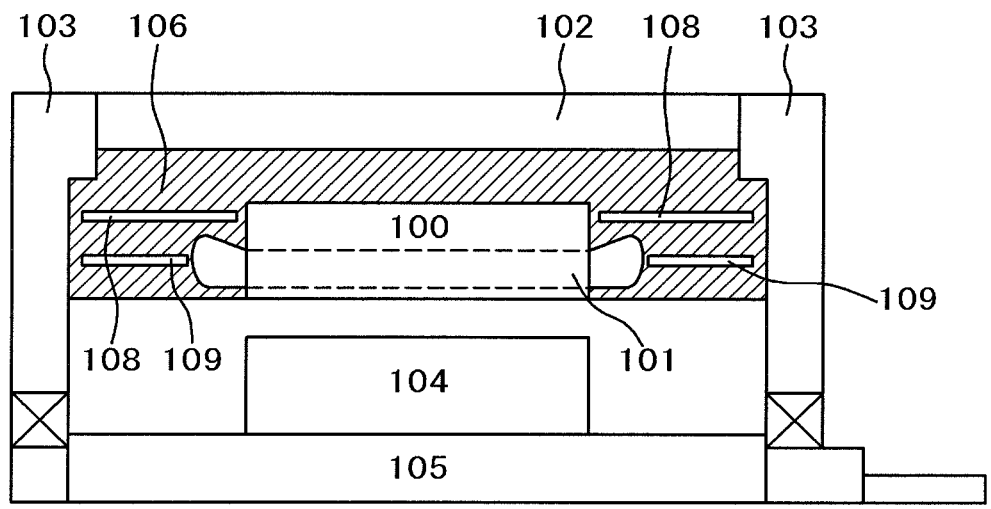
FIG. 9 is a cross-sectional view of a rotary electromotor according to a ninth embodiment of the invention.

FIG. 9 is a cross-sectional view of a rotary electromotor according to a ninth embodiment of the invention.

In a structure of the ninth embodiment shown in FIG. 9, in addition to the space between the stator 100 and the end covers 103, a space between the stator 100 and the stator frame 102 is filled with the resin material 106. The stator is typically assembled with the stator frame such that first the stator frame is heated so that an inner circumferential portion of the stator frame expands, then the stator is inserted in the stator frame, and thereafter the stator frame is cooled to contract and shrink, thereby fixing the stator to the stator frame. When the stator frame shrinks, a great stress occurs from its inner circumferential portion toward its center or core, thereby pressing the stator to distort the stator by a compressive stress. This adversely influences the properties of the stator.

The adverse influence in the stator properties may lead to heat generation. Hence, according to this embodiment, the space between the stator and the stator frame is filled with the resin material which functions as a buffer to reduce the compressive stress. In the known structure the stator and the stator frame both made of metal are closely fitted on each other. On the other hand, in the embodiment the resin material is interposed therebetween, which is disadvantageous in enhancing the radiation performance of the electromotor.

Therefore, highly heat-conductive sheets 108, 109 in an annular shape are disposed to axially extend from the stator winding 101 and stator 100 to the end covers 103. Or alternatively, segments of each of highly heat-conductive sheets 108, 109 obtained by severing the sheets 108, 109 to have a width are circumferentially arranged at a spacing interval. The highly heat-conductive sheets 108, 109 or the segments thereof in the circumferential arrangement are integrally formed with the resin material 106, in order to form an axially extending heat conduction path for heat radiation to enhance the radiation performance of the electromotor. The resin material interposed between the stator and the stator frame absorbs vibrations occurring at the stator and prevents direct propagation of the vibrations to the stator frame. Thus, this embodiment is effective to reduce the vibrations and noise, too. To prevent the radial dimension of the electromotor from becoming excessively large, the amount of the resin material filling the space between the stator and the stator frame should be optimized in view of its effects to reduce the compressive stress and the radiation performance.

In this embodiment, the heat conduction path for heat radiation provided by the sheets 108, 109 may be substituted by any of the heat conduction paths provided by the sheets 107, 108, 109 described above with respect to the first to seventh embodiments. Further, the ninth embodiment may be implemented in combination with the eighth embodiment to further enhance the radiation performance.

In this embodiment, ends of the sheets 108, 109 in the electromotor axial direction are separated from the stator 100, stator winding 101, and end covers 103. This improves the electrical insulation compared to the case without the separation. Where any of the heat conduction paths provided by the sheets 107, 108, 109 in the first to seventh embodiments is employed in this embodiment as described above, the separation of the sheet (s) from the stator 100, stator winding 101, and end covers 103 is not made. In enhancing the radiation performance, this is advantages over the case with the separation. In this embodiment, it is not essential to separate both ends of each of the sheets 108, 109 from the stator 100, stator winding 101, and end covers 103, but the effect of the embodiment can be obtained even where only one end of the sheet is separated. Whether both or only one of the ends is to be separated is determined in view of the electrical insulation and the radiation performance to be achieved. Even where the separation is made, the presence of the sheets 108, 109 conducting the heat with a higher thermal conductivity than the resin material enhances the thermal conduction and accordingly the radiation performance of the electromotor, compared to the case where only the resin material is present and the sheet is omitted.

It is noted that the sheets 107, 108, 109 in the first to seventh embodiments may be separated from the stator, stator frame, and end covers, as described above with respect to the present embodiment.

Tenth Embodiment

Figure 10:
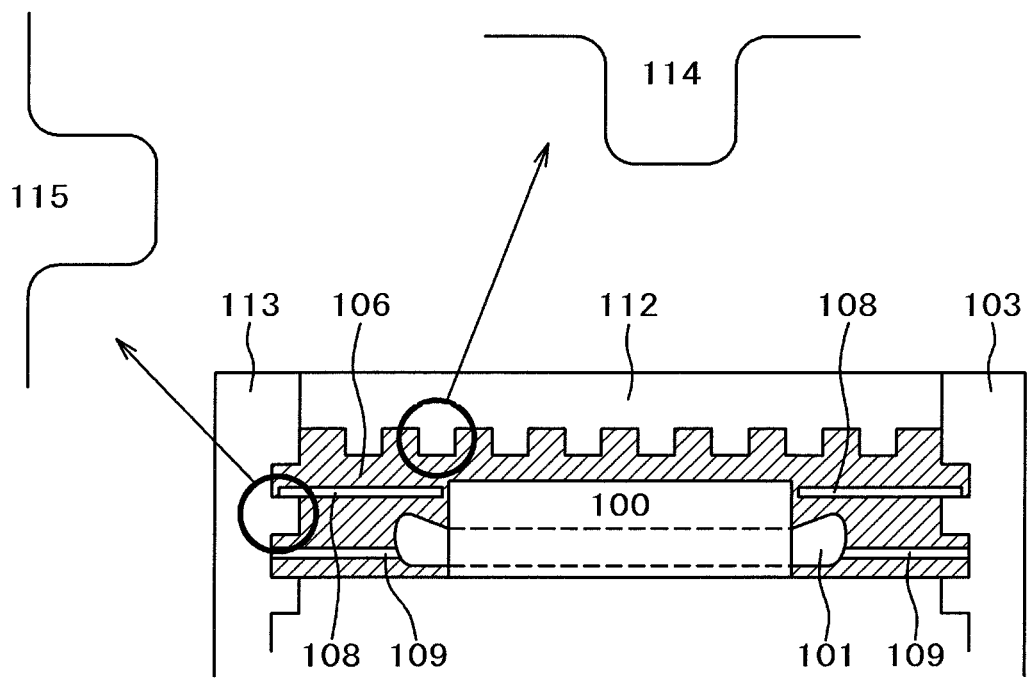
FIG. 10 is a cross-sectional view showing a stator according to a tenth embodiment of the invention.

FIG. 10 is a cross-sectional view of a rotary electromotor according to a tenth embodiment of the invention.

A structure of the tenth embodiment shown in FIG. 10 is a modification of that of the ninth embodiment shown in FIG. 9, and differs from that of the ninth embodiment in that inner surfaces of the stator frame 112 and end covers 113 are irregular or have a plurality of projections 114, 115.

According to this embodiment, the area over which the resin material and the stator frame are in contact with, or bonded to, each other is increased, thereby improving the bonding strength therebetween. When a resin material fills a space defined inside a member with a projection with a sharp corner and sets, cracking tends to occur at the sharp corner. Hence, in this embodiment, corners of the projections 114, 115 are rounded at a curvature in order to prevent occurrence of the cracking.

The stator frame 112 and end covers 103 having the projections 114, 115 in the tenth embodiment may be applied to the first to ninth embodiments to obtain the effects of the tenth embodiment.

Eleventh Embodiment

Figure 11:
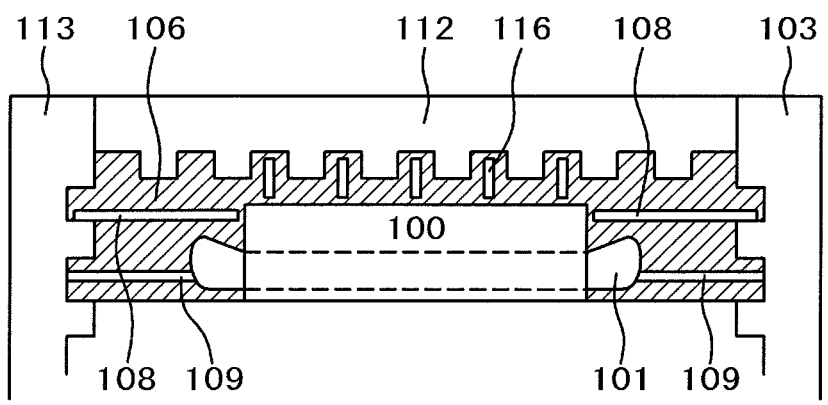
FIG. 11 is a cross-sectional view showing a stator according to an eleventh embodiment of the invention.

FIG. 11 is a cross-sectional view of a rotary electromotor according to an eleventh embodiment of the invention.

A structure of the eleventh embodiment is a modification of the tenth embodiment, and differs from that of the tenth embodiment in that highly heat-conductive sheets 116 are disposed in the resin material 106 filling the space between the stator 100 and the stator frame 112. The highly heat-conductive sheet 116 is formed integrally with the resin material 116, and may be in an annular shape or take the form of segments with a width that are circumferentially arranged at a spacing interval.

According to the eleventh embodiment, the radiation performance of the electromotor is enhanced not only with respect to its axial direction but also with respect to its radial direction. Further, this embodiment is advantageously reduces the compressive stress exerted on the stator, as described above with respect to the tenth embodiment.

The heat conduction path for heat radiation provided by the sheets 108, 109 in the eleventh embodiment may be substituted by the heat conduction path(s) provided by the sheet (s) 107, 108, 109 in any of the first to seventh embodiments. Where the heat conduction path(s) in the first to seventh embodiments is employed, both or only one of the two ends of the sheet 107, 108, 109 may be separated from the stator, stator frame, and end covers, as in the ninth embodiment. Further, the eleventh embodiment may be implemented in combination with the eighth embodiment. When the eleventh embodiment is implemented in combination with the eighth embodiment, the radiation performance is further enhanced.

Twelfth Embodiment

Figure 12:
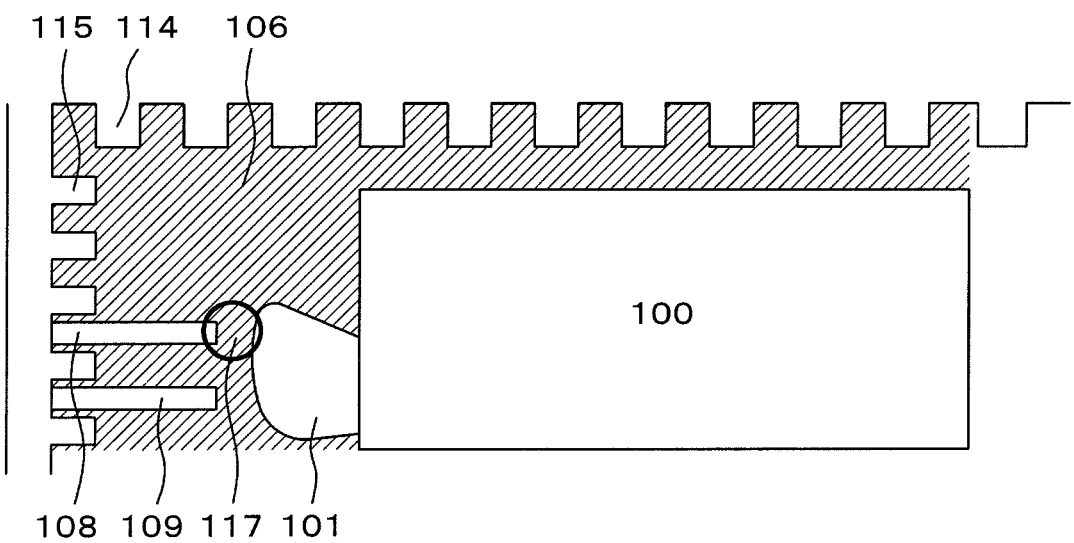
FIG. 12 is a cross-sectional view showing a stator according to a twelfth embodiment of the invention.

FIG. 12 is a cross-sectional view of a rotary electromotor according to a twelfth embodiment of the invention.

A structure of the twelfth embodiment shown in FIG. 12 is a modification of that of the tenth and eleventh embodiments. That is, in the twelfth embodiment, an insulation distance 117, which is a distance by which the highly heat-conductive sheets 108, 109 are separated from the stator winding 101 for insulation purpose, is varied in accordance with the size of the electromotor.

Generally, assuming that the same degree of insulation as slot insulation is required, separation by a distance of about 0.25 mm or more is necessary. However, the necessary insulation distance depends on the kind of the resin material used and other conditions. According to this embodiment, the insulation distance is flexibly varied as required in individual cases.

The arrangement related to the insulation distance 117 of the twelfth embodiment is equally applicable to the first to eleventh embodiments.

Thirteenth Embodiment

Figure 13:
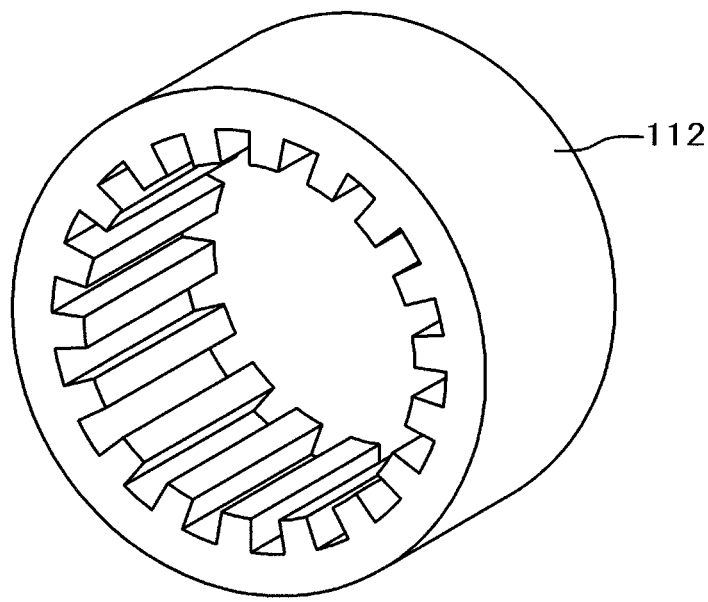
FIG. 13 shows a thirteenth embodiment of the invention.

FIG. 13 is a perspective view of a stator frame according to a thirteenth embodiment of the invention.

The thirteenth embodiment shown in FIG. 13 is such that in the tenth embodiment the projections formed on the stator frame 112 are arranged circumferentially.

The thirteenth embodiment enables to increase the contact area between the stator frame and the resin material and accordingly the bonding strength therebetween when the stator frame is short in the electromotor axial direction. Further, this embodiment enables to increase the contact area by decreasing the interval at which the projections are circumferentially arranged. However, since the mechanical strength of the stator frame decreases with a dimension of the projections in the circumferential direction, the projections should be designed with the interval and its width or dimension in the circumferential direction optimized, taking account of the contact area and the mechanical strength of the stator frame 112.

The arrangement of the projections according to the thirteenth embodiment is applicable to the stator 102, 112 in any of the first to twelfth embodiments.

Fourteenth Embodiment

Figure 14:
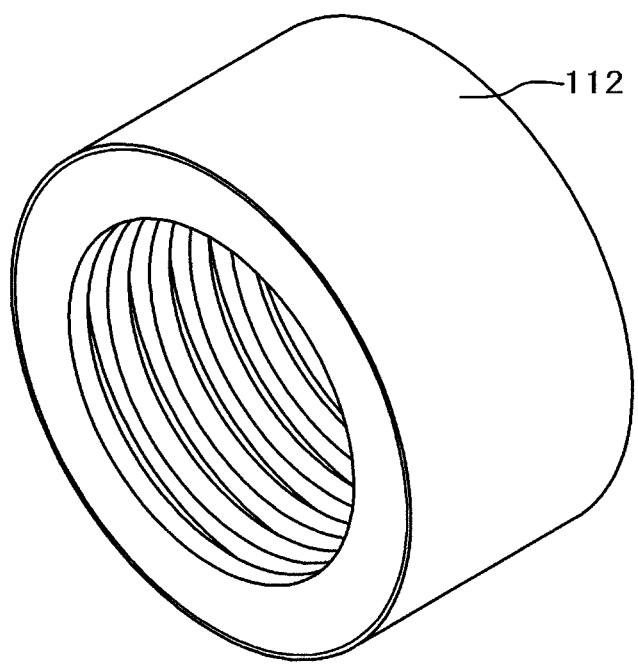
FIG. 14 shows a fourteenth embodiment of the invention.

FIG. 14 is a perspective view of a stator frame according to a fourteenth embodiment of the invention.

A structure of the fourteenth embodiment shown in FIG. 14 is such that in the tenth embodiment the projections formed on the stator frame 112 are arranged in the axial direction of the electromotor.

The fourteenth embodiment enables to increase the contact area between the stator frame and the resin material and accordingly the bonding strength therebetween when the outer diameter of the electromotor is large. Further, this embodiment enables to increase the contact area by decreasing the interval at which the projections are axially arranged. However, as in the thirteenth embodiment, the projections should be designed with the interval and its width or dimension in the axial direction optimized, taking account of the contact area and the mechanical strength of the stator frame 112.

The arrangement of the projections according to the fourteenth embodiment is applicable to the stator 102, 112 in any of the first to thirteenth embodiments.

Fifteenth Embodiment

Referring to FIGS. 4-6, there will be described a rotary electromotor with high radiation performance according to a fifteenth embodiment.

In the fifteenth embodiment, the stator 100 or an iron stator core and the permanent magnet disposed in the rotator 104, as in the fourth to sixth embodiments and shown in FIGS. 4-6, are respectively formed of or provided by an iron material having a saturation magnetic flux density of 2.2 T or higher and a permanent magnet having a magnetic flux density of 1.37 T or higher. The heat of the stator 100 is directly conducted to the end covers 103.

Generally, the permanent magnet is demagnetized, or its magnetic power is decreased, by a magnetic field generated by an electric current flowing in the stator winding, and by heat. It can be said that a permanent magnet having a higher coercivity less tends to demagnetize, where the term "coercivity" refers to the intensity of the magnetic field needed to reduce the magnetization of a material to zero after the material has reached saturation. However, a permanent magnet having a higher coercivity has a lower magnetic flux density. Thus, when used in a motor, a permanent magnet with a higher coercivity is disadvantageous in generating a large turning force. On the other hand, a permanent magnet having a lower coercivity has a higher magnetic flux density and advantageous in generating a large turning force.

In the fifteenth embodiment, an optimum combination of the materials of the stator and permanent magnet is achieved in view of the properties of the permanent magnet as described above. That is, the embodiment employs a permanent magnet with a high magnetic flux density and a low coercivity, and a stator formed of a material having a high saturation magnetic flux density and being capable of generating a high magnetic flux density with a low electric current. By combining such a stator and a permanent magnet, it is enabled to produce a large motor torque with a low electric current, while temperature is inhibited from rising by use of the low electric current, and the intensity of the magnetic field interacting with the magnet is low. Thus, although the electromotor uses a permanent magnet with a low coercivity, the electromotor is capable of generating a large torque without suffering from demagnetization.

According to the invention, miniaturization of a rotary electromotor is realized while its radiation performance is enhanced by forming a highly heat-conductive sheet integrally with the resin material. Further, by filling a space between the stator and the stator frame with the resin material, the compressive stress exerted on the stator is reduced, in turn reducing the iron loss of the stator. The resin material filling the space also inhibits propagation of vibrations occurring at the stator to the stator frame, which is advantageous in reducing vibrations and noise.

What is claimed is:

1. A rotary electromotor comprising:
a stator having a plurality of magnetic poles;
a stator winding on the stator;
a stator frame supporting the stator;
a rotator supported by the stator with a gap therefrom such that the rotator is rotatable;
end covers closing opposite ends of the stator frame; and
a highly heat-conductive member fixed by a resin material in a space defined inside the stator, the stator frame, and the end covers, wherein
the highly heat-conductive member is a graphite sheet conducting more heat along its major surface than perpendicularly thereto, and wherein
the graphite sheet is disposed such that the major surface of the graphite sheet is located along a direction from a thermal source to a heatsink in the rotary electromotor.

2. The rotary electromotor according to claim 1, the thermal source is a heat generating portion of the rotator, wherein
the heatsink is a shaft supporting the rotator, wherein
the graphite sheet is disposed to extend from two axially opposite ends of the heat generating portion of the rotator to the shaft that supporting the rotator.

3. The rotary electromotor according to claim 2, which is of permanent magnet type including a permanent magnet in the rotator.

4. The rotary electromotor according to claim 2, which is of induction type including a secondary conductor in the rotator.

5. A rotary electromotor comprising:
a stator having a plurality of magnetic poles, and formed of an iron material having a saturation magnetic flux density not lower than 2.2 T;
a stator winding on the stator;
a stator frame supporting the stator;
a rotator supported by the stator with a gap therefrom such that the rotator is rotatable, the rotator including a permanent magnet having a magnetic flux density not lower than 1.37 T;
end covers closing opposite ends of the stator frame; and
a highly heat-conductive member and a resin material that are formed integrally with each other between the stator and the end covers, wherein
the highly heat-conductive member is a graphite sheet conducting more heat along its major surface than perpendicularly thereto, and wherein
the graphite sheet is disposed such that the major surface of the graphite sheet is located along a direction from a thermal source to a heatsink in the rotary electromotor.

* * * * *